(12) United States Patent
Shahin et al.

(10) Patent No.: US 12,516,709 B2
(45) Date of Patent: Jan. 6, 2026

(54) DRUM BRAKE CONSISTING OF TWO OR MORE PARTS CONNECTED BY ISOLATING MATERIAL

(71) Applicant: HL MANDO CORPORATION, Pyeongtaek-si (KR)

(72) Inventors: Hatem Shahin, Pfaffenhofen (DE); Kai Braun, Friedrichsdorf (DE); Lothar Wagner, Simmern (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 377 days.

(21) Appl. No.: 18/088,964

(22) Filed: Dec. 27, 2022

(65) Prior Publication Data
US 2023/0204082 A1    Jun. 29, 2023

(30) Foreign Application Priority Data
Dec. 27, 2021    (DE) .......................... 102021215051.9

(51) Int. Cl.
| | | |
|---|---|---|
| *F16D 65/10* | (2006.01) | |
| *F16D 65/827* | (2006.01) | |
| B32B 15/01 | (2006.01) | |
| F16D 51/16 | (2006.01) | |
| F16D 65/02 | (2006.01) | |
| F16D 65/78 | (2006.01) | |

(52) U.S. Cl.
CPC ........... *F16D 65/10* (2013.01); *F16D 65/827* (2013.01); *B32B 15/012* (2013.01); *F16D 51/16* (2013.01); *F16D 2065/132* (2013.01); *F16D 2065/1328* (2013.01); *F16D 2065/785* (2013.01); *F16D 2250/0007* (2013.01); *F16D 2250/0069* (2013.01)

(58) Field of Classification Search
CPC .................. F16D 65/10; F16D 65/132; F16D 65/82–833; F16D 2065/1328; F16D 2065/785; F16D 51/16; F16D 2250/0007; F16D 2250/0069; B32B 15/012
See application file for complete search history.

(56) References Cited

U.S. PATENT DOCUMENTS

| | | | | |
|---|---|---|---|---|
| 1,847,714 A | * | 3/1932 | Gillies ................... | F16D 65/10 188/218 R |
| 2,109,110 A | * | 2/1938 | Frank ..................... | F16D 65/10 164/332 |
| 3,575,270 A | | 4/1971 | Wagenfuhrer et al. | |
| 9,709,114 B2 | | 7/2017 | Fakhoury | |
| 2010/0140033 A1 | | 6/2010 | Monsere et al. | |

(Continued)

FOREIGN PATENT DOCUMENTS

| | | | | | |
|---|---|---|---|---|---|
| CN | 106369080 A | * | 2/2017 | | |
| CN | 112628318 A | * | 4/2021 | ............. | F16D 65/78 |

(Continued)

OTHER PUBLICATIONS

Office Action From Korean Patent Office, Dated Oct. 15, 2025.

*Primary Examiner* — David R Morris
(74) *Attorney, Agent, or Firm* — Harvest IP Law, LLP (57) ABSTRACT

A brake drum includes an outer drum, at least one layer of heat resistant adhesive, provided at least on the inner radial surface of the outer drum, and an inner drum provided inside the outer drum connected with the outer drum via the at least one adhesive layer.

14 Claims, 9 Drawing Sheets

(56) References Cited

U.S. PATENT DOCUMENTS

2014/0144735 A1\* 5/2014 Berwanger ............. F16D 65/10
188/218 R
2021/0156439 A1\* 5/2021 Huschenhoefer ... F16D 69/0416

FOREIGN PATENT DOCUMENTS

| DE | 198 58 317 A1 | 6/2000 |
|----|---|---|
| DE | 10 2017 207 062 A1 | 10/2018 |
| DE | 10 2018 220 763 A1 | 6/2020 |
| EP | 0 386 652 A1 | 9/1990 |
| KR | 10-2005-0042692 A | 5/2005 |
| KR | 10-2010-0039662 A | 4/2010 |
| KR | 10-2017-0082749 A | 7/2017 |
| KR | 10-1786289 B1 | 10/2017 |

\* cited by examiner

Prior Art

FIG. 1

Prior Art

DRUM BRAKE CONSISTING OF TWO OR MORE PARTS CONNECTED BY ISOLATING MATERIAL

CROSS-REFERENCE TO RELATED APPLICATION

This application is based on and claims priority under 35 U.S.C. § 119 to German Patent Application No. 102021215051.9, filed on Dec. 27, 2021 in the German Patent and Trade Mark Office, the disclosures of which are incorporated herein by reference.

TECHNICAL FIELD

The invention relates to a brake drum, to a method of producing a brake drum and to a drum brake assembly

BACKGROUND

There are two types of brakes systems widely used in the automobile field. Disc brakes are brake systems in which brake pads, typically held by calipers, press against a rotating disk, creating friction and reducing its rotational speed, thereby slowing down the attached axle or wheel. Drum brakes on the other hand consist of a rotating cylinder-shaped part, called a brake drum, and brake shoes disposed therein. When activated, these shoes press outwards against the inner surface of the brake drum to cause friction. While at present, disc brakes are more common in a lot of applications, drum brakes have certain advantages that make them attractive for future applications. Among these advantages are longer maintenance intervals, a closed design that protects the friction surfaces from outside particles and corrosive influences, better collection of brake dust and a reduction of torque drag.

In general, brake drum are produced as integral pieces made, for example, of cast iron. These brake drums exhibit certain disadvantages, such as the relatively heavy weight of the drum and high operating noise. In addition, heat dissipation in the drum tends to be problematic. During heavy braking substantial heat is created, which can lead to the thermal expansion of the drum. This thermal expansion can lead to changes in the relative distances between brake drum and brakes shoes, causing reduced braking efficiency or at least an altered brake pedal feel for the driver. This effect is known as brake fade.

In an attempt to provide better cooling of the brake drum, U.S. Pat. No. 9,709,114 B2 discloses a brake drum furnished with patterns of holes or slots along the circumference of the drum. In the prior art, it has also been known to reinforce the drum with one or more rings to allow for a more lightweight construction, such as in KR 20170082749 A or KR 20050042692 A.

SUMMARY

The object of the present invention is to provide a drum brake with a brake drum that overcomes the above mentioned disadvantages. In particular, the invention provides a brake drum that is constructed in such a way that thermal expansion is controlled to reduced brake fade.

This object is solved by a brake drum as defined in the independent claim, by a method according to claim 14 and by a drum brake assembly according to claim 15. Possible embodiments are described in this description and in the dependent claims.

In particular, the suggested brake drum comprises an outer drum, at least one layer of heat resistant adhesive, provided at least on the inner radial surface of the outer drum, and an inner drum provided inside the outer drum connected with the outer drum via the at least one adhesive layer.

The outer drum comprises the brake drum housing. It is designed to be affixed to a rotatable component of a vehicle, such as an axle or a wheel hub. The outer drum may substantially have the base form of a right circular cylinder, with its axis coinciding with the rotational axis of the rotatable component of the vehicle. Described as a drum, or pot, the brake drum may have the form of a cylinder closed one and open on the other of its base sides. It may have cylinder mantle surface that extends about the rotational axis of the brake drum and a base section connected to the cylinder mantle surface and substantially orthogonal to it. The drum may also have the base form of a truncated cone, with an angled mantle surface, an open and a closed circular base side. The outer drum may be produced from any material commonly used to produce brake drums, such as cast iron.

At least the inner radial surface of the outer drum is covered with a layer of a heat resistant adhesive. The adhesive layer may additionally cover a closed base side of the outer drum. The adhesive layer provides a permanent connection between the outer drum and the inner drum. During braking operation, the adhesive layer may experience high amounts of mechanical stress. During braking operation, the adhesive layer may also experience high temperatures and high temperatures gradients. The material of the adhesive layer has to be chosen such that it provides a reliable connection under these conditions without breaking down. The heat resistant adhesive of the adhesive layer may for example be chose form suitable organic adhesives, such as epoxies, or inorganic adhesives, such silicon ceramic based adhesives. Multiple layers of different heat resistant materials may be provided between the inner and the outer drum.

The inner drum is positioned inside the circumference of the outer drum. In use in a drum brake assembly, it may provide the friction surface for the brake shoes. The inner drum may have a form substantially similar to the outer drum, but with a smaller circumference. The inner and the outer drum may have the same or different proportions with regards to the thickness of their circumferential walls. The inner and the outer drum may consist of the same or of different materials. The inner drum is permanently connected to the outer drum via the at least one layer of heat resistant adhesive.

Due to the arrangement of an outer drum and an inner drum, connected via a layer of heat resistant adhesive, the thermal expansion of the brake drum due to heating occurring during braking operation can be controlled. While a standard brake drum known in the art expands outwards, wherein an outwards direction is defined as radially away from the rotational axis of the brake drum. This results in an increased distance between the inner surface of the brake drum and the brake shoes, leading to decreased braking efficiency. In a brake drum according to the present invention, thermal expansion of the inner drum is confined by the outer drum. Due to the at least one layer of heat resistant adhesive, the inner and the outer drum are exposed to different degrees of heating and therefore different degrees of thermal expansion. The inner drum cannot expand outwards and instead has to expand inwards, towards the brake shoes.

The layer of heat resistant adhesive may also provide a dampening effect, resulting in reduced noise emission. In combination with an optimized design and choice of materials, this configuration also allows for a reduced mass of the drum brake.

The inner drum may substantially have the same form as the outer drum. That is, the inner drum may also constitute a cylinder or truncated cone with one open base side and one closed base side. In this case, the closed base side of the inner drum may abut against the closed base side of the outer drum through the layer of heat resistant adhesive. This may allow to confine the transfer of heat and vibration to the inner drum.

Alternatively, the inner drum may constitute a cylinder or truncated cone with two open base sides. In this case the interior volume of the brake drum is defined on one side by the outer drum. This may allow an improved heat dissipation through the outer drum while still confining the radial surfaces of the inner drum.

The at least one layer of heat resistant adhesive may have thermally insulating properties. This may allow to more strongly confine the heat transfer and the thermal expansion to the inner drum, therefore increasing the effect of the invention.

The invention is not limited to a single inner drum. Additional inner drums may be nested inside the outer drum, each with at least one additional layer of heat resistant adhesive. At least one additional layer of heat resistant adhesive may be provided at least on the inner radial surface of the inner drum and an additional inner drum may be provided inside the inner drum and connected with the inner drum via the at least one additional adhesive layer. This way, an additional barrier for heat and vibrational transfer may be achieved.

The brake drum may comprise further additional layers of heat resistant adhesive and further additional inner drums nested inside the outer drum to improve this effect.

The inner drum or the inner drums (i.e., the also the additional inner drum and further additional inner drums, where applicable) may be, in addition to their fixation via the adhesive layer or layer, further secured in the outer drum via mechanical means. These mechanical means may comprise bolts, rivets or the like. The mechanical means may be provide additional stability and a more secure connection. Depending on their position and make up, the additional mechanical connections means may also influence the direction of the thermal expansion as well as allow for a more precise management of heat dissipation.

The outer drum and the inner drum may be formed of different materials. If more than one inner drum is nested inside the outer drum, each inner drum may be formed of a different material. For example, the innermost drum may be formed of an especially wear-resistant cast iron, as it is designed to be in frictional contact with the brake shoes. An outer drum may for example be formed of aluminium to reduce the weight of the brake drum.

In particular, the outer drum and the inner drum or drums may be formed of materials with different thermal expansion coefficients. As an example, the outer drum may be formed of a material with a thermal expansion coefficient which is lower than the thermal expansion coefficient of the material of the inner drum. This allows for an effective containment of the thermal expansion of the drum brake even without a strong insulating effect of the adhesive layer.

A wall of the outer drum may comprise at least one cavity. It may also comprise several cavities. These cavities may support the dissipation of heat and structural noise.

Similarly, a wall of the inner drum or a wall of the inner drums may comprise at least one cavity. They may also comprise several cavities. These cavities may support the dissipation of heat and structural noise.

The aforementioned cavities may be filled with a thermally insulating material. The cavities may also be filled with a dampening material to prevent structural noise.

The invention further concerns a method of producing the described brake drum. A method of producing a brake drum comprises that at least an outer drum or an inner drum is provided by casting or sheet bending, and at least a layer of heat resistant adhesive is provided by additive manufacturing methods.

An outer drum may be provided by casting or sheet bending. An inner drum may also be provided by casting or sheet bending. Additional parts may also be provided by other suitable methods of metalworking.

At least a layer of heat resistant adhesive is provided by an additive manufacturing process, such 3D-printing. Additional parts may also be provided by additive manufacturing processes.

Thus, a simple method of producing a brake drum with advantageous properties regarding heat dissipation and thermal expansion is provided.

The brake drum according to the invention is designed to be used in a drum brake assembly. In particular, such a drum brake assembly comprises a brake drum as described, at least one brake shoe arranged within the brake drum, and at least one brake cylinder connected to the at least one brake shoe, wherein the at least one brake shoe is displaceable by the brake cylinder relative to the brake drum, such that during braking the brake shoe contacts the brake drum.

The brake drum is coupled to a rotating element, such as an axle or wheel hub. Brake shoes and the brake cylinder are affixed to a non-rotatable backing plate.

The hydraulic engagement of the brake cylinder pushes the brake shoes against the inner cylindrical surface of the brake drum, slowing the rotation of the brake drum and the coupled element down via friction.

Due to the advantageous properties of the described brake drum, such a drum brake assembly has an improved braking efficiency and exhibits less brake fade. The drum brake assembly may also perform at a lower noise level and is able to be designed with reduced weight.

BRIEF DESCRIPTION OF DRAWINGS

Embodiments of the invention are described in further detail below with respect to the attached schematic figures. Same features may be marked with the same reference signs throughout the figures.

DETAILED DESCRIPTION

Figure 1:
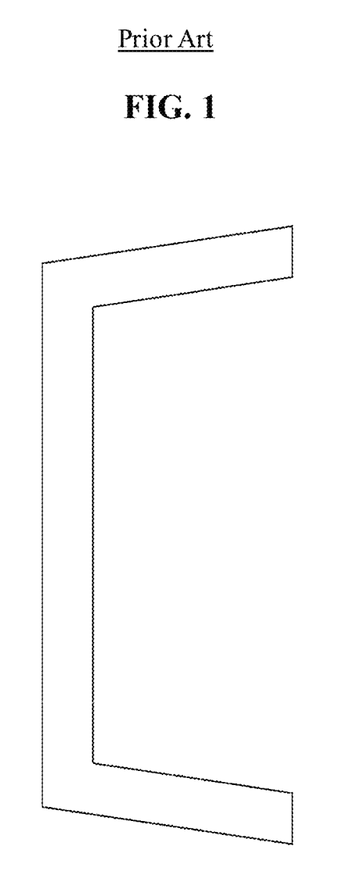
FIG. 1 is a schematic cross section of a brake drum known in the prior art.

FIG. 1 shows a simplified cross section of an abstracted brake drum as it is known from the prior art. The plane of the cross section is a plane through the rotational axis of the brake drum. The depicted brake drum is axially symmetrical. The base sides of the drum are assumed to be substantially circular. The brake drum is depicted as a truncated cone or a cylinder with slightly oblique side surfaces. One base side of the drum is closed, the other base side is open.

Figure 2:
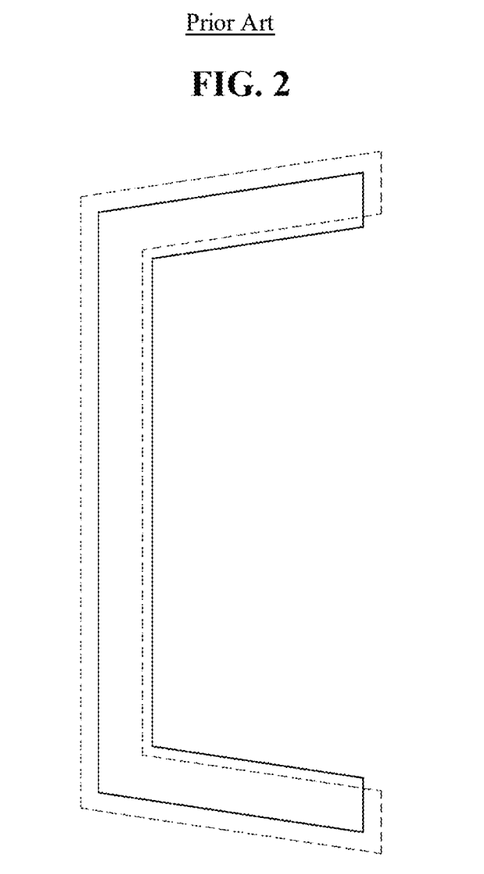
FIG. 2 is a schematic representation of the thermal expansion of brake drum known in the prior art during and after braking operation.

The brake drum depicted in FIG. 1 is formed of a single piece. In practice, it may be formed of cast iron. In a drum brake, the inner surface of the rotating brake drum provides the friction surface against which the brake shoes are pushed during braking operation. The resulting friction slows down the rotation of the brake drum and the coupled elements. However, this friction also results in the production of considerable heat. This leads the brake drum to expand during and after braking. This thermal expansion is depicted in FIG. 2 with the dotted lines. Due to the geometry of the brake drum, the material expands outwards, both radially and along the rotational axis. This leads to an increased distance between the inner surface of the brake drum and the brake shoes. The result is a decreased braking efficiency, known as brake fade.

Figure 3:
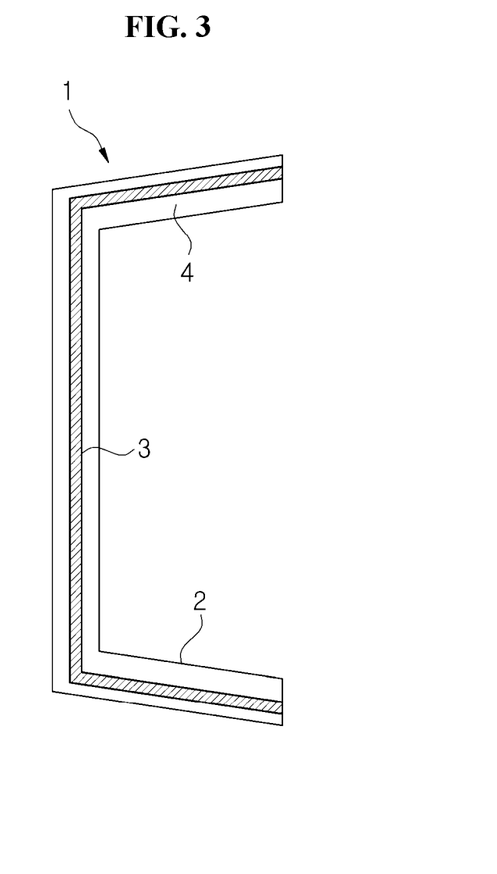
FIG. 3 is a schematic cross section of a brake drum according to a first embodiment.

FIG. 3 shows a first embodiment of the brake drum 1 according to the invention. To overcome the described problem, the brake drum 1 consists of two drums nested inside each other. The outer drum 2 and the inner drum 4 have substantially the same form, with the inner drum 4 being scaled down so as to fit inside the outer drum 2. The outer drum 2 and the inner drum 4 are connected to each other with a layer of a heat resistant adhesive 3.

The layer of heat resistant adhesive 3 provides a fixed connection between the drum parts and additionally provides a barrier for heat dissipation inside the brake drum 1. During breaking operation, the outer drum 2 therefore heats up to a lesser degree than the inner drum 4. As a result, the outer drum 2 also expands to a lesser degree. Since the inner drum 4 is confined by the outer drum 2, it is forced to expand inwards, towards the brake shoes. This increases brake efficiency in comparison with a standard brake drum.

To improve this effect, the layer of heat resistant adhesive 3 can be formed of an adhesive that has thermally insulating properties, to confine heat dissipation largely to the inner drum 4. The outer drum 2 and the inner drum 4 can also be formed of different materials with different thermal expansion coefficients. To provide for a reliable confinement of the inner drum 4, the outer drum may be formed of a material that has a very low thermal expansion coefficient. If the adhesive layer 3 provides good insulation, the outer drum 2 may also be formed of a lightweight material such as aluminum, which otherwise exhibits high thermal expansion. To provide the friction surface of the inner drum 4, cast iron may be advantageous due to its wear-resistance. By choosing materials with different physical properties, such as weight, wear-resistance, thermal conductance and thermal expansion and designing the thickness of the drum parts accordingly, expansion behavior of the brake drum can effectively be controlled.

The adhesive layer 3 may provide the additional advantage of providing a vibrational damping element between the outer drum 2 and inner drum 4, resulting in less noise emission.

Figure 4:
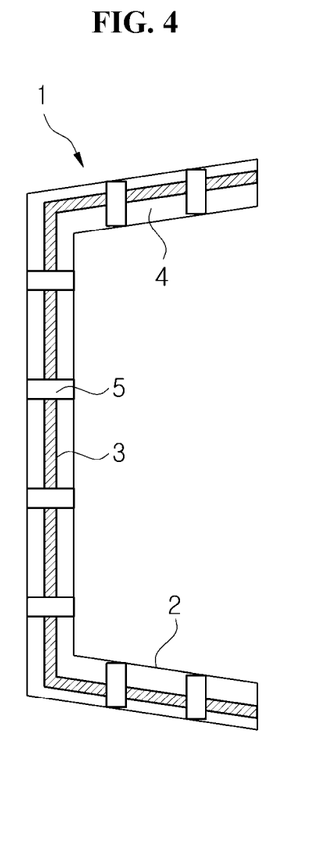
FIG. 4 is a schematic cross section of a brake drum according to a second embodiment.

FIG. 4 shows a second embodiment of the brake drum according to the invention. In this embodiment, the inner drum 4 is secured inside the outer drum 2 not just by the adhesive layer 3, but also by mechanical means 5, which may constitute bolts or rivets. These mechanical means 5 reinforce the connection between the outer drum 2 and the inner drum 4 and can so further restrict the expansion of the drums against each other. Additionally, these mechanical means 5 may serve as controlled paths for heat dissipation.

Figure 5:
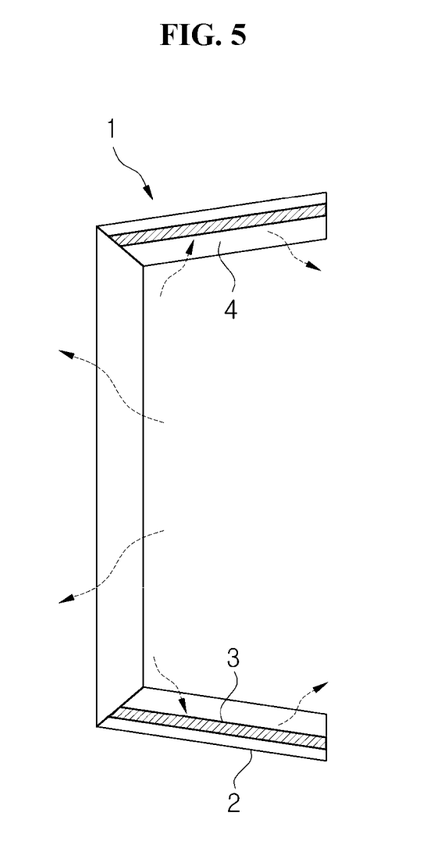
FIG. 5 is a schematic cross section of a brake drum according to a third embodiment.
Figure 6:
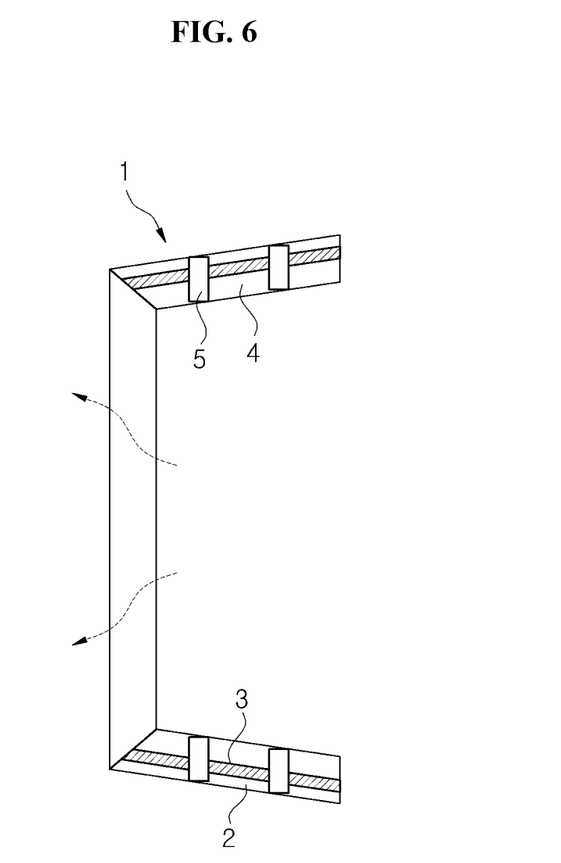
FIG. 6 is a schematic cross section of a brake drum according to a fourth embodiment.

FIGS. 5 and 6 show two embodiments in which the inner drum 4 has a different form than the outer drum 2. While the outer drum 2 is closed on its (left) base side, the inner drum 4 is open on both of its base sides. Accordingly, inner drum 4 only abuts against the inner circumference of the outer drum 2 and only the inner circumference of the outer drum 2 is provided with a layer of heat resistant adhesive 3. FIGS. 5 and 6 also show possible paths of heat transfer within the brake drum 1 as dotted arrows. While is hindered in its dissipation through the side walls of the drum by the adhesive layer 3, heat transfer through the base side of the outer drum 2 is unimpeded. As a result, these embodiments allow the transport of heat out of the brake drum 1 while controlling the heating, and therefore expansion, of the side surfaces of the brake drum 1. In the third embodiment of FIG. 5, the outer drum 2 and the inner drum 4 are only connected via the adhesive layer 3. FIG. 6 shows a fourth embodiment in which the additional physical means 5 are used to connect outer drum 2 and inner drum 4.

Figure 7:
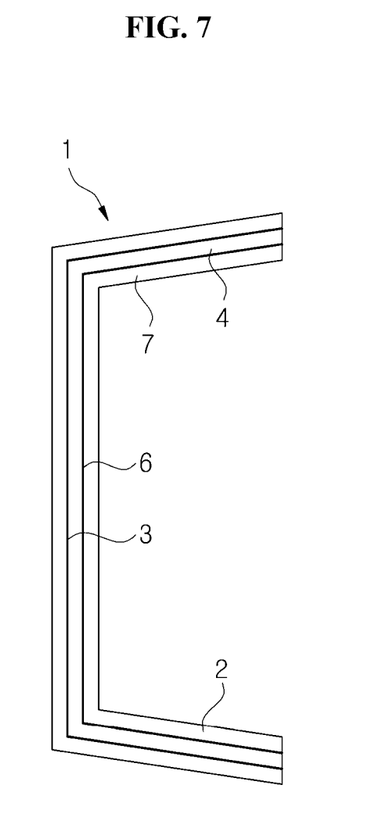
FIG. 7 is a schematic cross section of a brake drum according to a fifth embodiment.

FIG. 7 shows a fifth embodiment that uses multiple layers of inner drums. As in previous embodiments, a first inner drum 4 is connected with the outer drum 2 via a heat resistant adhesive layer 3. An additional layer of a heat resistant adhesive 6 is provided on the inner surface of the first inner drum 4 and a second inner drum 7 is provided within it. Using multiple adhesive layers 3, 6 like this and choosing the material of the first inner drum 4 with advantageous thermal properties can lead to a better thermal insulation and allows for improved control over the behavior of the brake drum 1 under braking operation.

Figure 8:
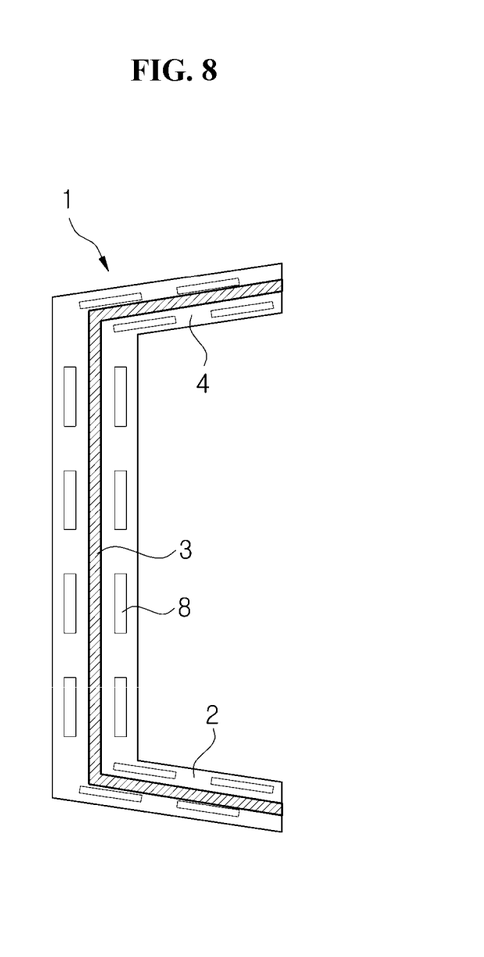
FIG. 8 is a schematic cross section of a brake drum according to a sixth embodiment.

FIG. 8 shows a sixth embodiment of a brake drum according to the invention. In this embodiment, the outer drum 2 and the inner drum 4 are formed with hollow cavities 8 therein. These cavities 8 reduce the weight of the brake drum 1 and can provide additional thermal insulation, as well as support to dissipate structural noise. The cavities 8 may be air-filled or filled with an insulating material. While FIG. 8 shows cavities 8 in both the outer and the inner drum, they may also be limited to one drum parts.

The described embodiments are not exclusive to one another, but can of course be combined to achieve a combination of the described effects.

To produce a brake drum 1 according to the invention, at least one of the outer drum 2 or the inner drum 4 can be formed by casting or sheet bending. As a result, these drum parts can be easily produced with the same tools used to produce conventional brake drums. The adhesive layer 3 may be applied to the inner surface of the outer drum 2 by additive manufacturing. The method of producing a brake drum 1 therefore only involves relatively few, simple steps.

Figure 9:
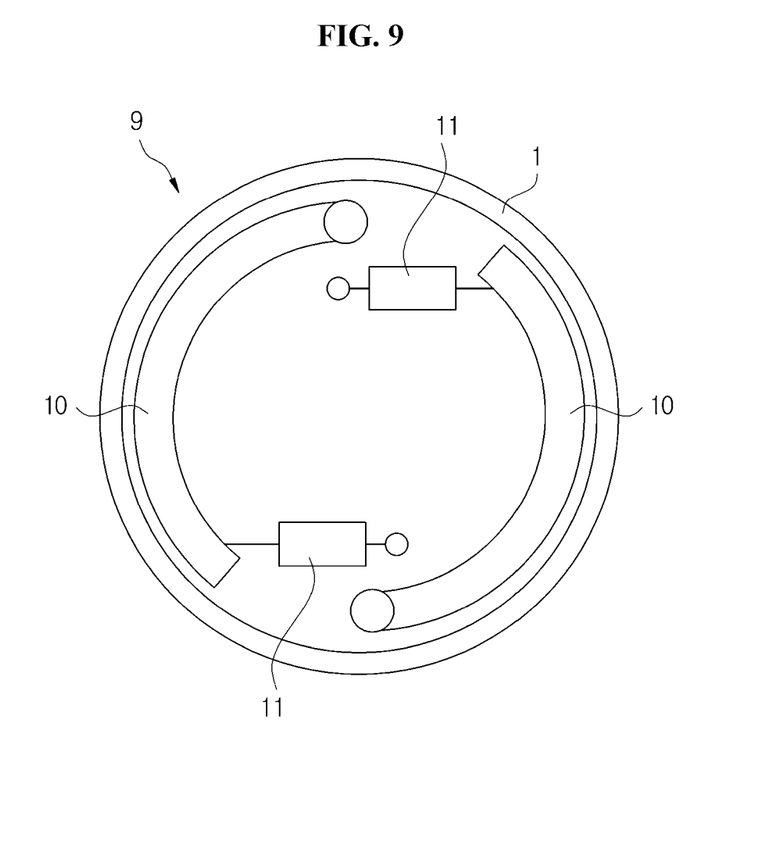
FIG. 9 is a schematic plan view of a drum brake assembly comprising a described brake drum.

The brake drum 1 can then be placed in a regular drum brake assembly, as is shown in FIG. 9. A drum brake assembly 9 comprises a brake drum 1, brake shoes 10 and brake cylinders 11. The brake drum 1 may comprise any of the features of the embodiments described above. During braking operation, the brake shoes 10 are pressed by the brake cylinders 11 against the inner radial surface of the brake drum 1, which is formed by the inner drum 4. The resulting friction heats up the inner drum 4. However, since heat dissipation and thermal expansion are controlled due to the combination of outer drum 2, adhesive layer 3 and inner drum 4, the surface of the inner drum 4 does not expand away from the brake shoes 11 and brake fade is prevented.

What is claimed is:

1. A brake drum, comprising
an outer drum,
at least one layer of heat resistant adhesive, provided at least on an inner radial surface of the outer drum,
an inner drum provided inside the outer drum connected to the outer drum via the at least one adhesive layer,
wherein at least one additional layer of heat resistant adhesive is provided at least on an inner radial surface of the inner drum,
an additional inner drum provided inside the inner drum connected to the inner drum via the at least one additional layer of heat resistant adhesive,
wherein the layer of heat resistant adhesive is provided between the outer drum and the inner drum,
and the additional adhesive layer is provided between the inner drum and the addition inner drum.

2. The brake drum according to claim 1, wherein the inner drum is formed with one closed base side.

3. The brake drum according to claim 1, wherein the inner drum is formed with two open base sides.

4. The brake drum according to claim 1, wherein the at least one layer of heat resistant adhesive is thermally insulating.

5. The brake drum according to claim 1, wherein further additional layers of heat resistant adhesive and further additional inner drums are nested within the inner drum.

6. The brake drum according to claim 1, wherein the inner drum is additionally secured inside the outer drum via mechanical means.

7. The brake drum according to claim 1, wherein the outer drum and the inner drum are formed of different materials.

8. The brake drum according to claim 1, wherein the at least one additional inner drum is made of a material different from the material of the outer drum and the material of the inner drum.

9. The brake drum according to claim 8, wherein the materials have different thermal expansion coefficients.

10. The brake drum according to claim 1, wherein a wall of the outer drum comprises at least one cavity.

11. The brake drum according to claim 1, wherein a wall of the inner drum comprises at least one cavity.

12. The brake drum according to claim 10, wherein the at least one cavity is filled with thermally insulating material.

13. A method of producing a brake drum according to claim 1, wherein
at least one of the outer drum and the inner drum is provided by casting or sheet bending,
at least the layer of heat resistant adhesive is provided by additive manufacturing methods.

14. A drum brake assembly for a motor vehicle, comprising
a brake drum according to claim 1,
at least one brake shoe arranged within the brake drum,
at least one brake cylinder connected to the at least one brake shoe, wherein the at least one brake shoe is displaceable by the brake cylinder relative to the brake drum, such that during braking the brake shoe contacts the brake drum.

* * * * *